(12) United States Patent
Kiasaleh

(10) Patent No.: US 6,324,234 B1
(45) Date of Patent: Nov. 27, 2001

(54) SYNCHRONIZATION AND CLOCK RECOVERY

(75) Inventor: Kamran Kiasaleh, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/210,424

(22) Filed: Dec. 11, 1998

Related U.S. Application Data

(60) Provisional application No. 60/069,559, filed on Dec. 12, 1997.

(51) Int. Cl.[7] .............................. H04L 7/027; H04L 7/00
(52) U.S. Cl. .............................................. 375/355
(58) Field of Search ................... 375/219, 343, 375/316, 358, 335, 354, 355

(56) References Cited

U.S. PATENT DOCUMENTS 5,995,569 * 11/1999 Shimoi et al. ................ 375/354

OTHER PUBLICATIONS

"A Method for Coarse Frequency Acquisition for Nyquist Filtered MPSK", Ahmed, et. al., *IEEE Transactions on Vehiculat Technology*, vol. 45, No. 4, 11/96, pp. 720–731.

* cited by examiner

*Primary Examiner*—Chi Pham
*Assistant Examiner*—Dung X. Nguyen
(74) *Attorney, Agent, or Firm*—J. Dennis Moore; W. James Brady, III; Frederick J. Telecky, Jr.

(57) ABSTRACT

The present invention provides for joint estimation of data clock and frame timing in, for example, an M-ary phase-shift-keying (MPSK) signaling scheme with raised-cosine (RC) baseband pulse shaping. Asynchronous samples of the MPSK signal are obtained at a sampling rate greater than the Nyquist rate. A Fast Fourier Transform (FFT) processor processes the acquired samples, and the outcome is passed on to an absolute-value device followed by a peak detector. The present invention then operates to extract clock and frame information from the MPSK signal using a dotting pattern. In addition to clock recovery, the present invention provides for frame synchronization using the dotting pattern. The present invention thus eliminates the need for a long unique work (UW) frame synchronization pattern often included in the preamble of, for example, a time-division multiple-access (TDMA) signal to establish frame synchronization.

3 Claims, 3 Drawing Sheets

SYNCHRONIZATION AND CLOCK RECOVERY

This amendment claims priority under 35 USC §119(e)(1) of provisional application No. 60/069,559, filed Dec. 12, 1997.

TECHNICAL FIELD OF THE INVENTION

This invention relates generally to data communications and more specifically to a method and system for synclshonization and clock recovery.

BACKGROUND OF THE INVENTION

In certain data communications systems, a frame synchronization pattern is periodically inserted into the data stream by the transmitter. A conventional clock and frame recovery scheme at the receiver uses samples of an M-ary phase-shift-keying (MPSK) signal at the output of a Nyquist filter to reconstruct the data clock. The search mechanism used often requires a serial search of the received signal. Upon recovery of the data clock, the received bit or symbol streams are demodulated and the resulting bits or symbols are forwarded to a frame recovery mechanism that searches for a unique word (UW) of length L symbols which follows the synchronization pattern in the preamble of the MPSK signal. The length L of the UW should be long enough so that as compared to the frame length, the probability of the UW appearing in the data stream is minimized.

This scheme requires a reasonably accurate clock timing recovery before frame synchronization (or any form of communication) can take place. [See, for example, T. T. Ha, *Digital Satellite Communications*, $2^{nd}$ edition, McGraw-Hill, New York, 1990, pp. 230–241]. Any false or missed detection of the UW or of the synchronization pattern results in a loss of the data frame that follows the preamble. This in turn may result in large delays in, for example, a Time Division Multiple Access (TDMA) system operating in a less than ideal environment.

Moreover, the above scheme requires a synchronization pattern followed by a fairly long UW sequence to provide for synchronization at the receiver. An additional deficiency of the UW search method used in practice is the sub-optimum nature of the search mechanism. From a detection theory standpoint, the conventional method of recovering the UW of an MPSK signal, which uses a threshold test at the output of the sequence correlator, is a sub-optimum solution to the problem of codeword recovery in the face of additive Gaussian noise. One reason for this simplification is the prohibitively large computational complexity of an optimum codeword search.

SUMMARY OF THE INVENTION

The present invention provides for joint estimation of data clock and frame timing in, for example, an M-ary phase-shift-keying (MPSK) signaling scheme with raised-cosine (RC) baseband pulse shaping. Asynchronous samples of the MPSK signal are obtained at a sampling rate greater than the Nyquist rate. A Fast Fourier Transform (FFT) processor processes the acquired samples, and the outcome passed on to an absolute-value device followed by a peak detector. The present invention then operates to extract clock and frame information from the MPSK signal using a dotting pattern. A generalized case of the dotting pattern used has the form $\phi, \phi+\pi, \phi, \phi+\pi, \ldots$ where $\phi$ is selected from the MPSK signal constellation.

In addition to clock recovery, the present invention provides for frame synchronization using the dotting sequence described hereinabove. The present invention thus eliminates the need for a long unique work (UW) frame synchronization pattern often included in the preamble of, for example, a time-division multiple-access (TDMA) signal to establish frame synchronization.

These and other features of the invention that will be apparent to those skilled in the art from the following detailed description of the invention, taken together with the accompanying drawings.

DETAILED DESCRIPTION OF THE INVENTION

Figure 1:
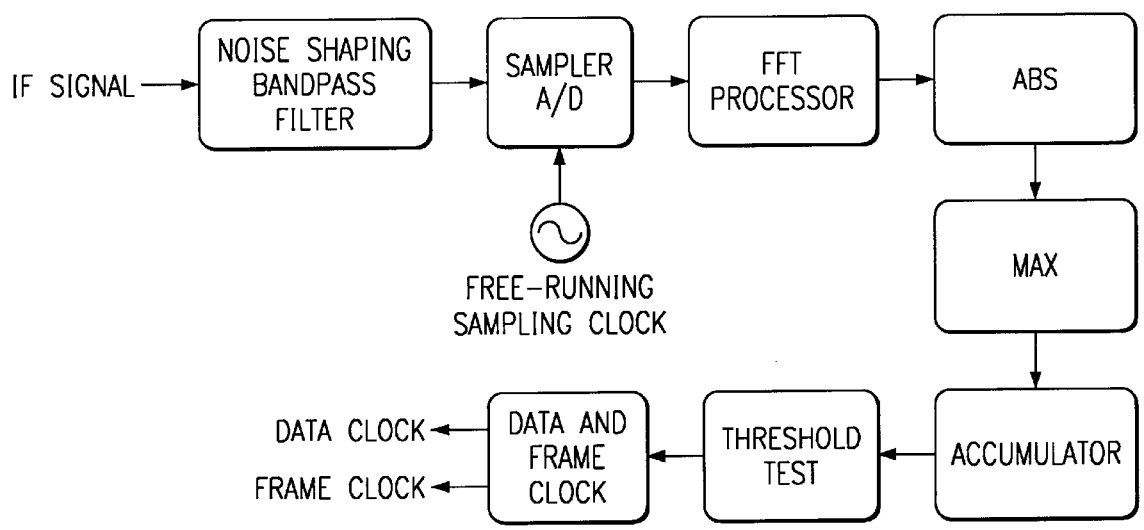
FIG. 1 is a block diagram of an FFT-based joint clock and frame recovery apparatus in accordance with the present invention.

It is assumed that the input signal is an MPSK signal corrupted by additive Gaussian noise and that the signal has been heterodyned to an intermediate frequency (IF). It is further assumed that the preamble of the MPSK signal contains only a dotting synchronization pattern and that no UW is included. The IF signal in FIG. 1 is filtered by a noise-limiting bandpass filter (if a square-root RC pulse shape is used at the transmitter, then the bandpass filter must be replaced with a Nyquist square-root RC filter) and is sampled using a free-running clock with a period that is smaller than half the symbol duration (i.e., a sampling clock rate greater than the Nyquist rate). The resulting samples are forwarded to an FFT engine that performs an FFT on an input vector of length N*L, where N is the number of samples per symbol duration.

To understand the means by which synchronization can be established using the above algorithm, consider $\tilde{x}(t)$, the complex envelope of a noise-corrupted MPSK signal with RC pulse shaping at the output of the IF filter. This signal may be expressed as $$\tilde{x}(t) = \tilde{s}(t) + \tilde{z}(t) = A\tilde{c}(t) \sum_{l=-\infty}^{\infty} e^{j\psi_l} P(t - lT_s) + \tilde{z}(t) \quad (1)$$

where A is the amplitude of the MPSK signal, $\tilde{c}(t)$ denotes the complex channel multiplicative distortion (MD) due to channel fading, $\psi_l$ is the $l^{th}$ MPSK data symbol taking on the MPSK constellation $$\left\{ \frac{2l-1}{M} \pi; l = 0, 1, 2, \ldots, (M-1) \right\},$$

Figure 2:
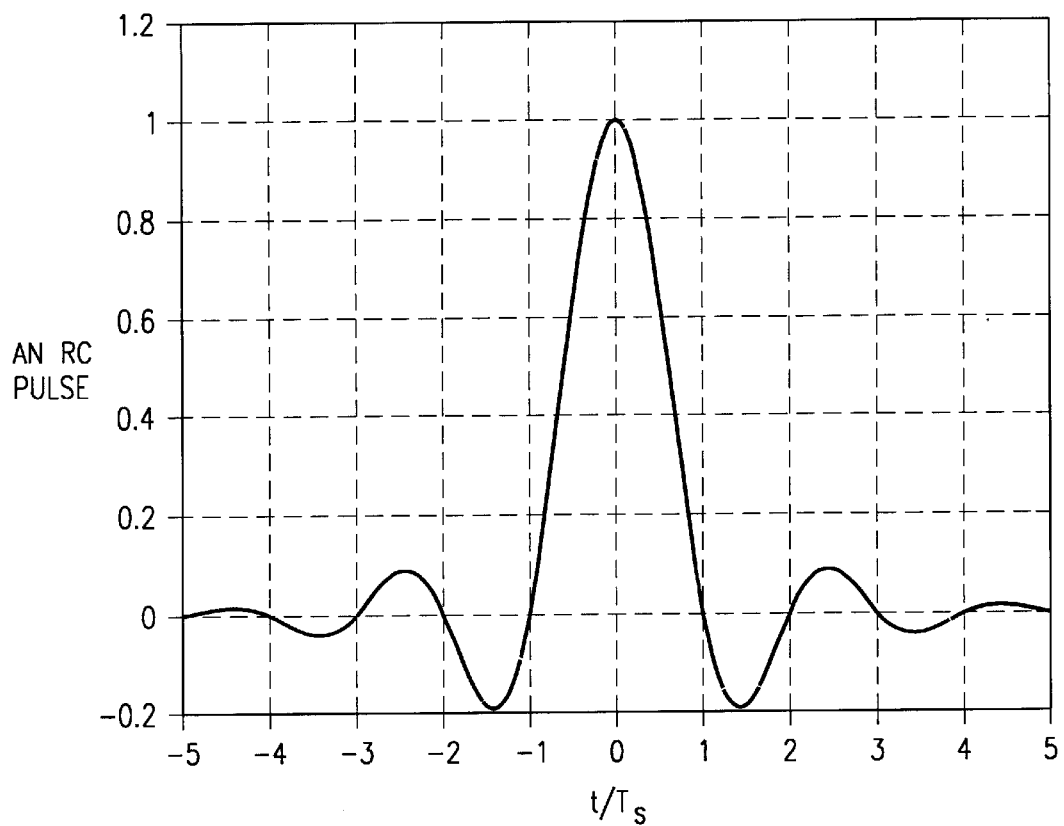
FIG. 2 shows a graph of an RC pulse shape with $\beta=0.25$.

P(t) is the RC baseband pulse shape, $T_s$ is the data symbol duration, and $\tilde{z}(t)$ is the complex envelope of the additive Gaussian noise. More specifically, $$P(t) = \text{sinc}\left(\pi \frac{t}{T_s}\right) \frac{\cos\left(\pi \beta \frac{t}{T_s}\right)}{1 - 4\pi^2 \beta^2 \frac{t^2}{T_s^2}} \quad (2)$$

where β is the roll-off factor for the RC pulse shape. A sample of this pulse shape is shown in FIG. 2. In equation (1), c̃(t) may be viewed as a bandlimited signal with the following auto-correlation function, (see, for reference, K. Feher, Wireless Digital Communications: Modulation and Spread Spectrum Applications, Prentice-Hall, Upper Saddle River, N.J., 1995, p. 78)

$$E\{\tilde{c}(t)\tilde{c}^*(t+\tau)\} = e^{j\omega_e t} J_0(2\pi f_d \tau) \quad (3)$$

where $E\{\}$ represents the expected value, * denotes the complex conjugate operation, $\omega_e$ is the residual frequency error due to any frequency estimation error, $f_d$ is the maximum Doppler shift in Hertz, and $J_0(\ )$ is a Bessel function of order 0.

A key attribute of the above pulse shape is that its spectrum is limited to the range $$\left(\frac{-1}{T_s}, \frac{1}{T_s}\right)$$

for all values of the roll-off factor. This particular feature is exploited in the current embodiment of the present invention to generate the desired signal for clock recovery. To elaborate, the signal in equation (1) is examined in more detail hereinbelow.

First, the modulating sequence in equation (1) is replaced with the dotting sequence φ, φ+π, φ, φ+π, . . . where φ is selected from the MPSK signal constellation. Also, consider the situation where the channel MD remains constant over the duration of the dotting sequence. For most practical situations, the MD remains relatively unchanged over many symbol intervals. Considering the limited length of a dotting sequence, this assumption can readily be met in practice. In that event, the first term in equation (1), which denotes the desired portion of the received signal, is now a periodic signal with a period of $2T_s$ seconds. This further implies that such a signal must have discrete spectral components at multiples of $$\frac{1}{2T_s} \text{ Hertz.}$$

Considering that the baseband pulse shape is bandlimited to $$\left(\frac{-1}{T_s}, \frac{1}{T_s}\right) \text{ Hertz,}$$

one arrives at the conclusion that the resulting signal includes spectral lines at $$\frac{1}{2T_s} \text{ Hertz}$$

and at 0 Hertz (the spectrum of P(t) is zero at $$\frac{1}{T_s} \text{ Hertz}).$$

It can be shown quite readily that the above signal has no spectral line at 0 Hertz, and hence the signal portion of equation (1) is a sinusoid with a period of $2T_s$. To validate this observation, consider the Fourier transform of s̃(t) when the above synchronization pattern is considered. For the sake of conciseness, assume that the period of the synchronization pattern is long enough so that the edge effects are of little consequence. In that event, $$\mathcal{F}\left(\sum_{l=-\infty}^{\infty} e^{j\psi_l} P(t-lT_s)\right) = \sum_{l=-\infty}^{\infty} e^{j\psi_l} \mathcal{F}\{P(t-T_s)\} = P(f) \sum_{l=-\infty}^{\infty} e^{j\psi_l - 2\pi j fl T_s} \quad (4)$$

where P(f) is the Fourier transform of P(t) and $\Im\{\ \}$ denotes the Fourier transform of the enclosed. Note that the summation is considered to be over a long period of time and that the channel condition is assumed to remain constant over the interval of time of interest. Since $\psi_l = \psi_{l-1} + \pi$ (which implies that $\psi_l = \psi_{l+2}$) for all l, then $$P(f) \sum_{l=-\infty}^{\infty} e^{j\psi_l - 2\pi j fl T_s} = P(f) e^{j\phi}\left[\sum_{l=-\infty}^{\infty} e^{-2\pi j(2l)fT_s} - \sum_{l=-\infty}^{\infty} e^{-2\pi j(2l-1)fT_s}\right]. \quad (5)$$

Realizing that $\sum_{l=-\infty}^{\infty} e^{-2\pi j(2l-1)fT_s} = \sum_{m=-\infty}^{\infty} \delta\left(f - \frac{m}{T_s}\right)$ and $\sum_{l=-\infty}^{\infty} e^{j\psi_l - 2\pi j(2l)fT_s} = \sum_{k=-\infty}^{\infty} \delta\left(f - \frac{k}{2T_s}\right)$, we arrive at $$P(f) \sum_{l=-\infty}^{\infty} e^{j\psi_l - 2\pi j fl T_s} = 2P(f) e^{j\phi} \sum_{l=-\infty; l \neq 0}^{\infty} \delta\left(f - \frac{1}{2T_s}\right). \quad (6)$$

Since P(f) is bandlimited to $$\left(\frac{-1}{T_s}, \frac{1}{T_s}\right) \text{ Hertz,}$$

then the resulting expression reduces to the Fourier transform of a $$\frac{1}{2T_s} \text{ Hertz}$$

sinusoid. Note that φ has no impact on the shape of the resulting signal and serves as a fixed phase offset. Moreover, the roll-off factor of the RC pulse only affects the amplitude of the resulting sinusoidal pattern.

Figure 3:
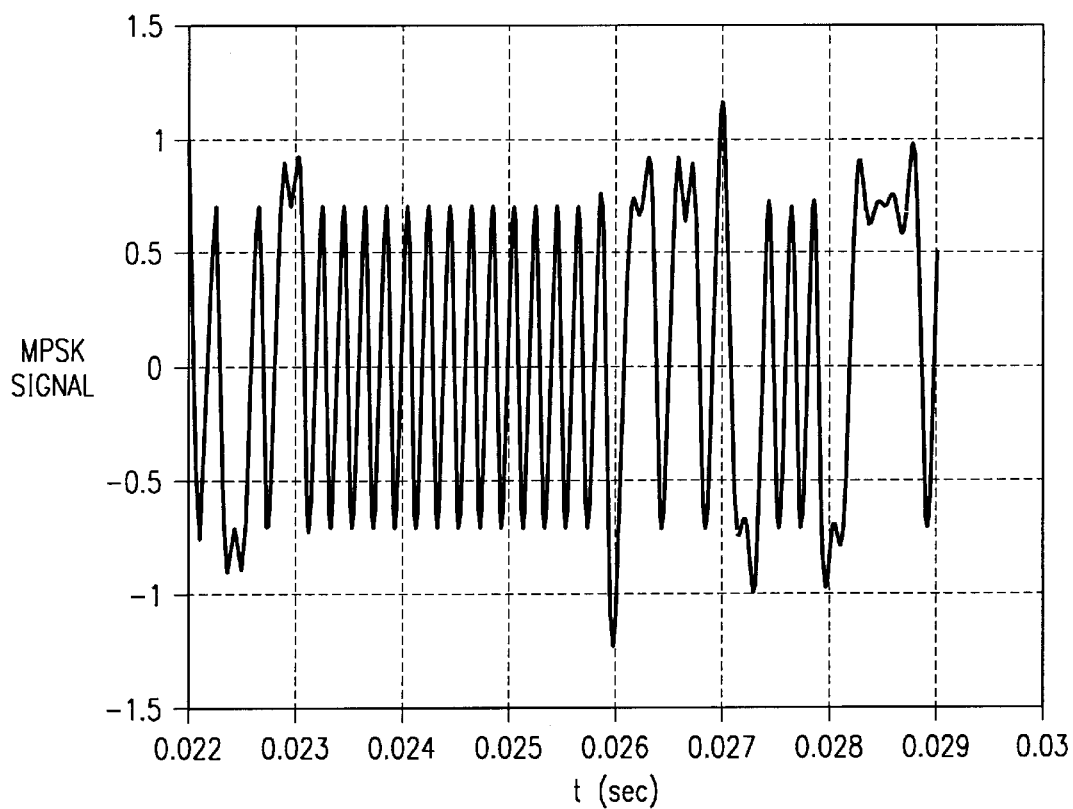
FIG. 3 illustrates a QPSK signal with RC pulse shaping where a dotting sequence of length thirty (30) symbols is embedded in random data.

FIG. 3 shows the signal portion of equation (1), i.e., $\tilde{s}(t)$, for M=4 and when a RC pulse shape with a roll-off factor of 0.25 is used.

It is quite evident that the resulting QPSK signal takes on a sinusoidal pattern when a dotting sequence is encountered. It is also important to note that the presence of data sequence that surrounds the dotting sequence has no significant impact on the shape of the sinusoidal signal due to the synchronization pattern. Obviously, as one increases the length of the synchronization pattern, any impact of the surrounding data symbols will only be noticeable for the first few symbols of the synchronization pattern. The presence of this distinct sinusoidal pattern affords an FFT-based search mechanism for the synchronization pattern. It is imperative to note that other investigators have used FFT-based algorithms for frequency acquisition (see, for example, W. K. M. Ahmed and P. J. McLane, "A method for Coarse Frequency Acquisition for Nyquist Filtered MPSK," *IEEE Transactions on Vehicular Technology*, vol. 45, no. 4, pp. 720–731, November 1996) of MPSK signals with RC pulse shape. However, the use of an FFT-based algorithm for clock recovery has never been attempted.

Figure 4:
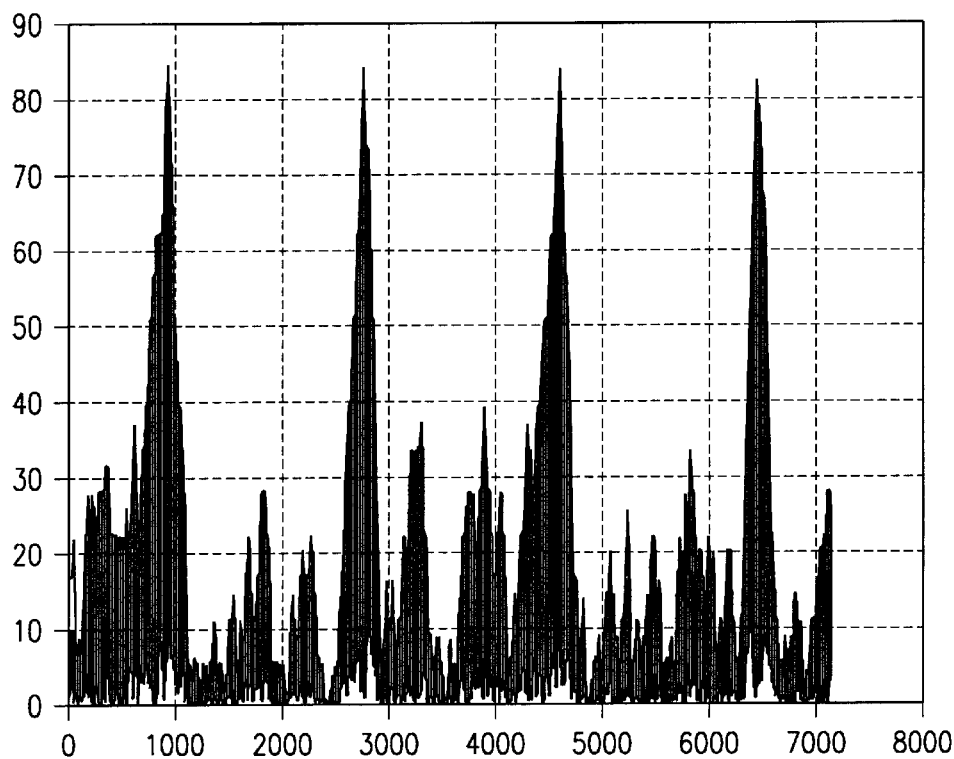
FIG. 4 shows a graph illustrating the output of a correlator device for a noiseless QPSK signal where the dotting sequence is thirty (30) symbols long.

To illustrate the means by which synchronization can be achieved, we first generate an equivalent synchronization signal at the receiver. In view of the above discussion, such a signal takes the following form $$y[k] = \cos\left(\frac{\pi k}{N}\right); k = 1, 2, \ldots, N \quad (7)$$

where we have assumed that there are N sample per symbol (N>2). From the detection theory in the face of additive Gaussian noise (AWGN), the optimum detector for the detection of a sequence given by equation (7) that is corrupted by an AWGN involves a correlation and an integration operation (or a multiplication followed by summation in the discrete domain case). The outcome of a correlation between QPSK (M=4) signal (in the absence of noise) and equation (7) is depicted in FIG. 4.

Figure 5:
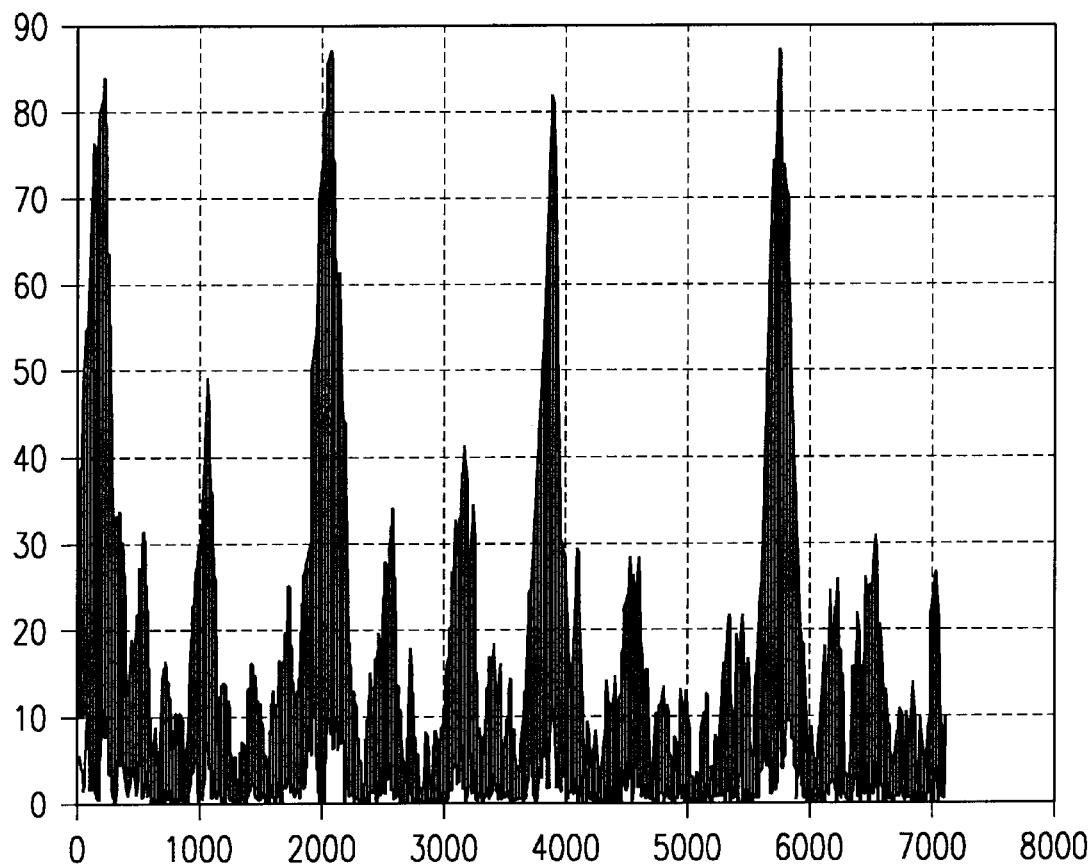
FIG. 5 depicts a graph illustrating the output of a correlator device for a noise-corrupted QPSK signal with a dotting sequence of length thirty (30) and where the SNR is set at 10 dB.

Clearly, the frame boundaries can be identified using an absolute value device followed by a peak detector. In FIG. 5, the same correlation when the QPSK signal is corrupted by an additive Gaussian noise (10 dB SNR) is depicted. Once again, the correlation operation has led to a correct detection of the synchronization pattern embedded in the data stream of the noisy MPSK signal. Since the correlation and the subsequent summation between any signal and equation (4) can be viewed as a DFT operation on a finite sample of the signal, one can benefit from an FFT engine to realize the correlation operation. This leads us to the detector depicted in FIG. 1.

In summary the novel attributes of the proposed synchronizer may be summarized as follows. First, the algorithm allows for a fast joint clock and frame recovery. For SNR levels in excess of 10 dB, it is shown that the algorithm achieves synchronization in the first 3–4 TDMA frames. This is superior to the conventional methods where clock and frame synclronization searches are conducted in a sequential manner.

Second, the need for a long UW for frame synchronization in a TDMA scenario is eliminated. Instead, upon the initial frame recovery, a short code (2–3 symbols) may be used to identify the individual sub-slots of a TDMA frame. Since in a TDMA scenario each sub-slot requires its own long UW with good cross-correlation properties, the proposed algorithm eliminates the need for a long preamble and, consequently, increases the multiple-access efficiency of a TDMA system by a sizable margin.

Third, since the algorithm operates on the samples of a noise-corrupted signal, it offers a near optimum search mechanism, whereas the conventional frame synchronizers require a symbol recovery prior to the UW search. Such a search is sub-optimum and is subject to false- and mis-detection.

Finally, since frequency acquisition at the receiver often requires an FFT operation, the above algorithm reduces receiver complexity by allowing the reuse of the existing architecture to achieve clock and frame synchronization.

Thus, in any situation where the identification of a periodic sequence embedded in data (or interfering sequence) is of interest and an RC pulse shape is utilized, one can achieve synchronization with the aid of the proposed algorithm. Although the above algorithm is suggested for use in a TDMA environment, any form of digitally phase modulated communication or control system can benefit from the proposed algorithm. This includes wireless computing systems, ranging systems, hybrid TDMA/CDMA systems, global clock distribution systems, etc.

Other Embodiments

Although the present invention and its advantages have been described in detail, it should be understood that various changes, substitutions and alterations can be made herein without departing from the spirit and scope of the invention as defined by the appended claims.

What is claimed is:

1. A data communication system comprising:
   a transmitter for transmitting a signal through a transmission medium;
   a receiver operable to receive said signal from said transmitter through said transmissions medium, said receiver having an estimator operable to jointly estimate data clock and frame timing in said received signal, wherein said estimator comprises:
   a sampler operable to obtain asynchronous samples of said received signal;
   an FFT processor for processing said asynchronous samples;
   an absolute-value device for generating the absolute value of said processed samples;
   a peak detector for detecting a maximum valued one of said absolute values of said processed samples; and
   an extractor operable to extract clock and frame information from said maximum valued absolute value.

2. A data communication systems comprising:
   a transmitter for transmitting a signal through a transmission medium;
   a receiver operable to receive said signal from said transmitter through said transmissions medium, said receiver having an estimator operable to jointly estimate data clock and frame timing in said received signal, wherein said estimator is operable to extract said data clock and frame information from said received signal using a dotting pattern.

3. A method, in a data communications system, for jointly estimating data clock and frame information from a received signal, the method comprising the steps of:

obtaining asynchronous samples of said received signal using a sampling device;

transforming said asynchronous samples using an FFT processor;

generating absolute values of said FFT processed samples;

detecting a maximum valued one of said absolute values of said processed samples; and extracting data clock and frame information from said maximum valued absolute value.

* * * * *